(12) United States Patent
Xiong

(10) Patent No.: US 12,058,967 B2
(45) Date of Patent: Aug. 13, 2024

(54) EXPANDABLE MODULAR PLANTING SYSTEM

(71) Applicant: Vego Garden Inc, Houston, TX (US)

(72) Inventor: Guangyuan Xiong, Houston, TX (US)

(73) Assignee: VEGO GARDEN INC, Houston, TX (US)

( * ) Notice: Subject to any disclaimer, the term of this patent is extended or adjusted under 35 U.S.C. 154(b) by 92 days.

(21) Appl. No.: 18/085,664

(22) Filed: Dec. 21, 2022

(65) Prior Publication Data

US 2023/0189722 A1 Jun. 22, 2023

Related U.S. Application Data

(60) Provisional application No. 63/292,462, filed on Dec. 22, 2021.

(51) Int. Cl.
*A01G 9/28* (2018.01)
*A01G 9/12* (2006.01)
*A01G 22/05* (2018.01)

(52) U.S. Cl.
CPC .............. *A01G 9/28* (2018.02); *A01G 9/12* (2013.01); *A01G 22/05* (2018.02)

(58) Field of Classification Search
CPC . A01G 9/28; A01G 22/05; A01G 9/12; A01G 9/02; A01G 9/024; A01G 13/02; A01G 27/00; A01G 27/04; A01G 23/007; A01C 23/007
See application file for complete search history.

(56) References Cited

U.S. PATENT DOCUMENTS

| | | | |
|---|---|---|---|
| 3,041,782 A * | 7/1962 | Bachman | A01G 9/02 47/39 |
| 8,813,422 B1 * | 8/2014 | Laudenklos | A01G 9/12 47/47 |
| 11,178,825 B2 * | 11/2021 | Ahl | A01G 9/12 |
| 2008/0313960 A1 * | 12/2008 | Norvitch | A01G 9/02 47/79 |
| 2011/0232176 A1 * | 9/2011 | Davis | A01G 9/12 47/45 |
| 2018/0359958 A1 * | 12/2018 | Schroeder | A01G 9/28 |
| 2019/0059240 A1 * | 2/2019 | Scott | A01G 9/022 |

FOREIGN PATENT DOCUMENTS

CN 104335839 A * 2/2015 ............. A01G 9/124

* cited by examiner

*Primary Examiner* — Ebony E Evans
(74) *Attorney, Agent, or Firm* — Locke Lord LLP; Tim Tingkang Xia, Esq.

(57) ABSTRACT

An expandable modular planting system (EMPS) for plant growing, the system comprising a garden bed having at least one wall panel for containing soil that is configured to grow at least one plant therein; and a weight support trellis module connected to the garden bed, wherein the weight support trellis module supports at least 30% of the at least one plant.

22 Claims, 19 Drawing Sheets

EXPANDABLE MODULAR PLANTING SYSTEM

CROSS-REFERENCE TO RELATED PATENT APPLICATIONS

This application claims priority to and the benefit of U.S. Provisional Patent Application Ser. No. 63/292,462, filed Dec. 22, 2021, which is incorporated herein in its entirety by reference.

FIELD OF THE INVENTION

The present disclosure relates generally to a garden bed assembly. In particular, the invention is directed to modular planting combinations with a variety of expanded functions, including rolling bed module, mesh cover module, dragon fruit weight support trellis module, and etc.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions.

The garden beds are a preferred way to grow the plants within an established area by many professional gardeners and amateur home owners. The use of the garden beds is particularly widespread in areas in which the soil is poor and/or where good drainage is required.

The garden beds are provided in many forms. However, common drawbacks of the garden beds limit the functionality of the garden beds. The common drawbacks include lacking of mobility so that the garden beds cannot be moved once it is constructed on the ground; lacking of protection against critters and pests; lacking of a self-watering system to collect excess water; lacking of weight supporting function for growing plants which require extra weight support during their growing and fruiting processes, e.g. dragon fruit.

Therefore, a need exists for an expandable modular planting systems to accommodating these drawbacks discussed above and improve the function and operation of the garden beds by expanding the garden bed with additional modular according a user's need.

SUMMARY OF THE INVENTION

In light of the foregoing, this invention discloses an expandable modular planting system (EMPS) which provides a customized modularized gardening system which can accommodate specific needs of a user. The EMPS includes add-on modules provide easy and practical functions to the garden beds. The MGS includes rolling beds module, mesh cover module, mister irrigation module, wicking cell/self-watering module, and dragon fruit weight support trellis module.

In one aspect of the invention, an expandable modular planting system (EMPS) for plant growing, the system comprising a garden bed having at least one wall panel for containing soil that is configured to grow at least one plant therein; and a weight support trellis module connected to the garden bed, wherein the weight support trellis module supports at least 30% of the at least one plant.

In one embodiment, the weight support trellis module comprises a top wheel support, and a plurality of trellis support legs.

In one embodiment, upper end of each trellis support leg is mechanically connected to the top wheel support, and lower end of each trellis support leg is mechanically connected the wall panel of the garden bed.

In one embodiment, the lower end of each trellis support leg comprises a niche which is in seamless contact with the wall panel of the garden bed.

In one embodiment, the niche comprises a hole configured to receive a fastener attaching the trellis support leg to the wall panel of the garden bed.

In one embodiment, the weight support trellis module is removable.

In one embodiment, the top wheel support comprises an outer frame, a center piece, and at least one beam connecting the out frame and the center piece.

In one embodiment, the vertical position of the center piece is lower than the vertical position of the outer frame such that the top wheel support has a concave shape which is configured to enhance the weight supporting capability of the weight support trellis module.

In one embodiment, the EMPS further comprises a wicking cell/self watering module, wherein the wicking cell/self watering module comprises a wicking tray having a water reservoir and at least one recessed cell in fluid communication with the water reservoir.

In one embodiment, the water reservoir collects the excess water from the soil via the recessed cell when the humidity of the soil is high.

In one embodiment, the water reservoir collects the excess water from the soil via the recessed cell when the humidity of the soil is high.

In one embodiment, the wicking tray is disposed on the bottom of the garden bed.

In one embodiment, the weight support trellis module further comprises a center support tube; wherein the center support tube is connected to the top wheel support on its upper end, and is in fluid communication with the wicking tray.

In one embodiment, the weight support trellis module further comprises a wicking tube disposed between the center support tube and the wicking tray; wherein the wicking tube fluidly connects the center support tube and the wicking tray.

In one embodiment, the center support tube is configured to receive water from an opening locates on the center piece of the top wheel support.

In one embodiment, the weight support trellis module supports at least 50% weight of the at least one plant.

In one embodiment, the weight support trellis module supports at least 70% weight of the at least one plant.

In one embodiment, the weight support trellis module supports at least 90% weight of the at least one plant.

In one embodiment, the at least one plant is a dragon fruit.

In one embodiment, the EMPS is movable.

In one embodiment, the EMPS further comprises a rolling bed module, wherein the rolling bed module comprises an outer frame and at least one supporting beam.

In one embodiment, the outer frame comprises a plurality of curved beams and straight beams, wherein the length of the curved beams and straight beams are adjustable.

In one embodiment, the length of the supporting beam is adjustable.

These and other aspects of the present invention will become apparent from the following description of the preferred embodiments, taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
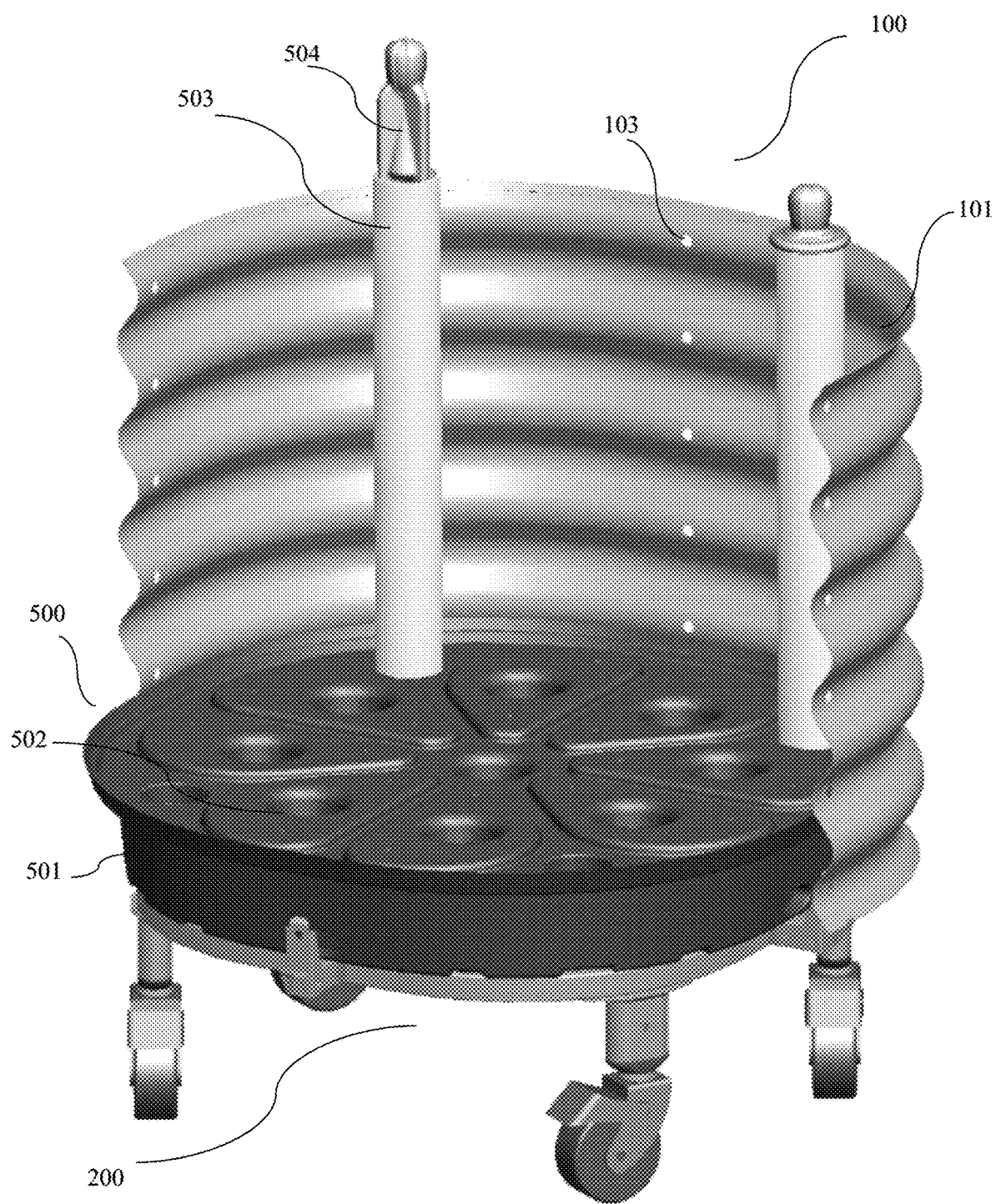
FIG. 1 depicts a perspective view of an expandable modular planting system (EMPS) including raised garden bed module, rolling beds module, and wicking cell/self-watering module according to embodiments of the invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this invention will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

One of ordinary skill in the art will appreciate that starting materials, biological materials, reagents, synthetic methods, purification methods, analytical methods, assay methods, and biological methods other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the invention has been specifically disclosed by preferred embodiments and optional features, modification and variation of the concepts herein disclosed may be resorted to by those skilled in the art, and that such modifications and variations are considered to be within the scope of this invention as defined by the appended claims.

Whenever a range is given in the specification, for example, a temperature range, a time range, or a composition or concentration range, all intermediate ranges and subranges, as well as all individual values included in the ranges given are intended to be included in the invention. It will be understood that any subranges or individual values in a range or subrange that are included in the description herein can be excluded from the claims herein.

It will be understood that, as used in the description herein and throughout the claims that follow, the meaning of "a", "an", and "the" includes plural reference unless the context clearly dictates otherwise. Thus, for example, reference to "a cell" includes a plurality of such cells and equivalents thereof known to those skilled in the art. As well, the terms "a" (or "an"), "one or more" and "at least one" can be used interchangeably herein. It is also to be noted that the terms "comprising", "including", and "having" can be used interchangeably.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Furthermore, relative terms, such as "lower" or "bottom" and "upper" or "top," may be used herein to describe one element's relationship to another element as illustrated in the figures. It will be understood that relative terms are intended to encompass different orientations of the device in addition to the orientation depicted in the figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be further understood that the terms "comprises" and/or "comprising", or "includes" and/or "including", or "has" and/or "having", or "carry" and/or "carrying", or "contain" and/or "containing", or "involve" and/or "involving", "characterized by", and the like are to be open-ended, i.e., to mean including but not limited to. When used in this disclosure, they specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used in the disclosure, "around", "about", "approximately" or "substantially" shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated.

As used in the disclosure, the phrase "at least one of A, B, and C" should be construed to mean a logical (A or B or C), using a non-exclusive logical OR. As used herein, the term "and/or" includes any and all combinations of one or more of the associated listed items.

Present system described herein features an expandable modular planting system (EMPS) which provides a customized modularized gardening system which can accommodate specific needs of a user. The EMPS includes add-on modules provide easy and practical functions to the garden beds. The MGS includes rolling beds module, mesh cover module, mister irrigation module, wicking cell/self-watering module, and dragon fruit weight support trellis module.

FIG. 1 shows an EMPS including a raised garden bed 100 module, a rolling bed module 200, and a wicking cell/self-watering module 500 according to embodiments of the invention.

It is readily appreciated that the raised garden bed 100 includes one or more wall panels forming a peripherally enclosed area for containing soils and plants grow therein. In one embodiment, the raised garden bed 100 also includes one or more angled joint panels having a predetermined or adjustable angle. The one or more angled joint panels are connected with the wall panels such that the raised garden bed may have a variety of shapes.

As shown in FIG. 1, the raised garden bed 100 is connected to and supported by the rolling bed module 200, which provides mobility to the raised garden bed. The rolling bed module 200 includes a plurality of wheels permitting to the garden bed to be rolled, facilitating the mobility of the garden bed.

The raised bed garden 100 is further illustrated in FIG. 1. The raised bed garden 100 includes one or more wall panels 101, which is made of metal, plastic, wood, or any other proper materials. In one embodiment, the raised bed garden 100 may further include one or more angled joint panels connected to the wall panels 101. The angled joint panels have a predetermined or adjustable angle. One or more angled joint panels are connected with the wall panels such that the raised garden bed may have a variety of shapes. The height of the wall panels ranges from 5 inches to 50 inches. In one embodiment, the wall panel may have a height of 5, 10, 15, 20, 25, 30, 35, 40, 45, or 50 inches.

In one embodiment, the raised garden bed 100 includes a plurality of fastening holes 103 in the wall panels 101 and/or angled joint panels. In one embodiment, the fastening holes connects the wall panels 101 to the angled joint panels, the rolling bed module 200, the mesh covers module 300, the mister irrigation module 400, or wicking cell/self-watering module 500. In one embodiment, the wall panels 101 is directly mechanically connected to the angled joint panels, the rolling bed module 200, the mesh covers module 300, the mister irrigation module 400, or the wicking cell/self-watering module 500 via one or more fasteners received through the fastening holes. In another embodiment, the wall panels 101 is indirectly mechanically connected to the angled joint panels, the rolling bed module 200, the mesh covers module 300, the mister irrigation module 400, or the wicking cell/self-watering module 500 via one or more connectors received by the fastening holes. In one embodiment, the fastening holes connects the wall panels 101 to the dragon fruit weight support trellis module 600, either directly, or indirectly via one or more trellis connectors.

Figure 2:
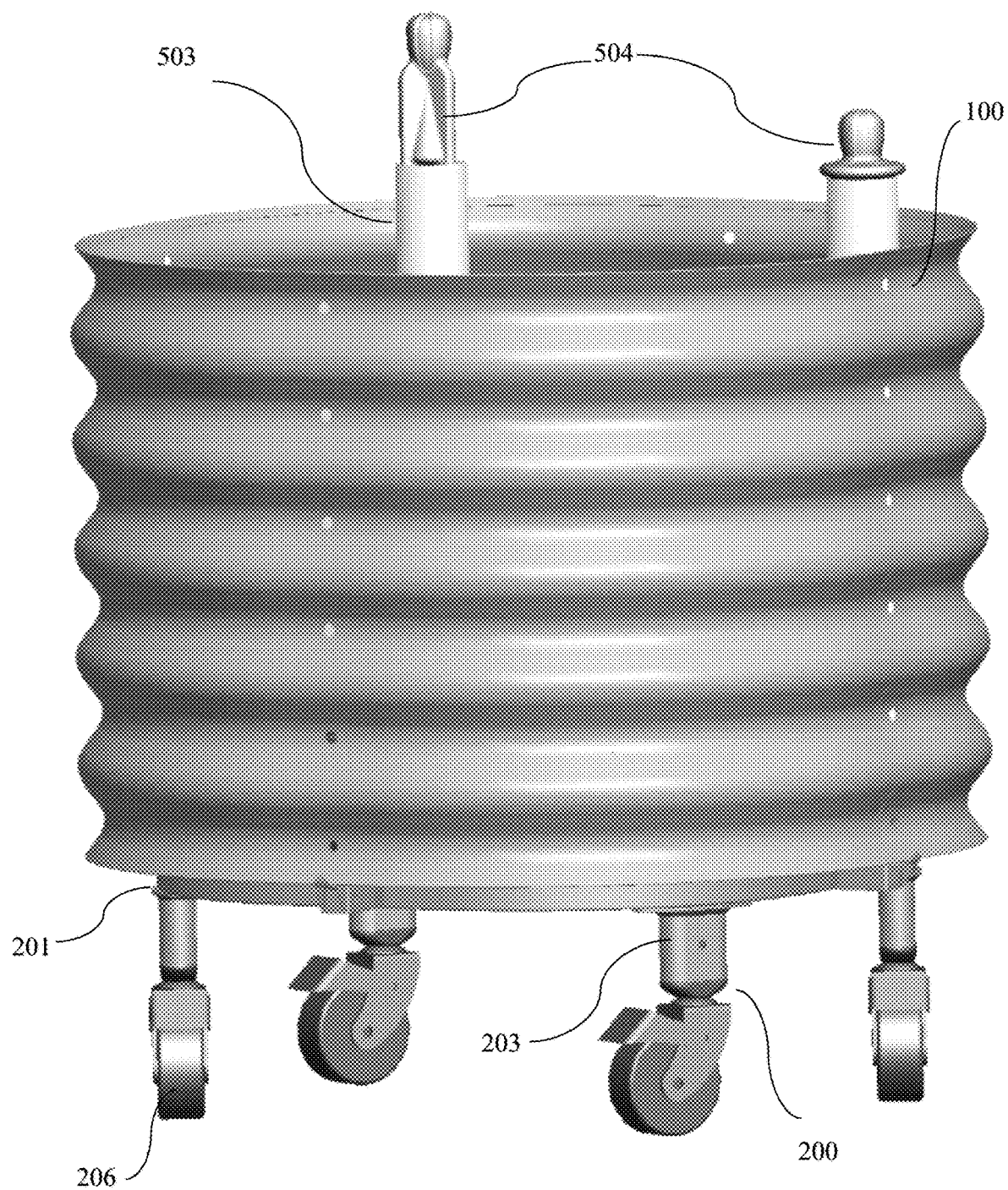
FIG. 2 depicts another perspective view of the EMPS including raised garden bed module, rolling beds module, and wicking cell/self-watering module shown in FIG. 1.

In one embodiment, the wall panel 101 includes a plurality of curved sections such that the wall panel 101 has a sinusoidal profile, as shown in FIGS. 1-2. In another embodiment, the wall panel includes a plurality of triangle or rectangular sections such that the wall panel has a triangle jagged or rectangular jagged profile, respectively.

Figure 10:
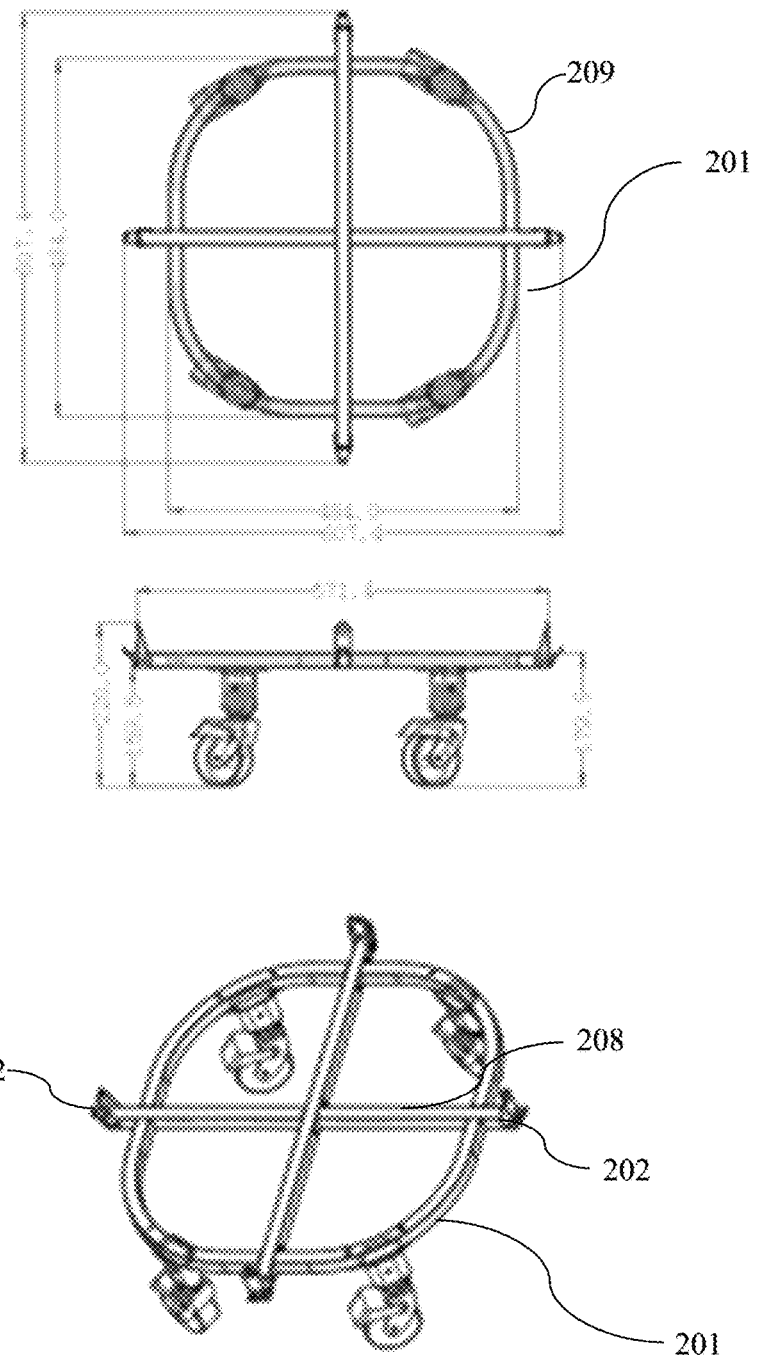
FIG. 10 depicts perspective views of a rolling bed module.

FIGS. 1-2 and 10 further show the rolling bed module 200. The rolling bed module 200 includes an elevated platform 201 on which the raised bed garden 100 is disposed. In one embodiment, the elevated platform 201 has an outer frame 209 which, in one embodiment, has the same shape comparing to the raised garden bed 100. In one embodiment, the outer frame 209 may have a shape different from the raised garden bed 100. In one embodiment, the elevated platform 201 includes a plurality of supporting beams 208 connected to the outer frame 209 so as to provide support to the raised garden bed 100. In one embodiment, the plurality of supporting beams 208 may be parallel with each other. In another embodiment, the plurality of supporting beams 208 may across and interconnected with each other.

As shown in FIG. 10, in one embodiment, one or more garden bed anchors 202 locate on the elevated platform 201 for connecting to and fastening the raised garden bed 100. In one embodiment, the garden bed anchors 202 are disposed on the outer frame of the elevated platform 201 and extend upward. In one embodiment, the garden bed anchors 202 are received by the raised garden bed 100 inside the perimeter of the wall panels 101, but outside the base perimeters of the wicking cells/self-watering module 500, as shown in FIGS. 1-2.

The rolling bed module 200 also includes one or more moving handles. In one embodiment, the moving handles may be attached to the elevated platform 201. In one embodiment, the elevated platform 201 may be attached to 1, 2, 3, 4, or more moving handles such that the rolling bed module 200 can be pulled in any direction.

Figure 14:
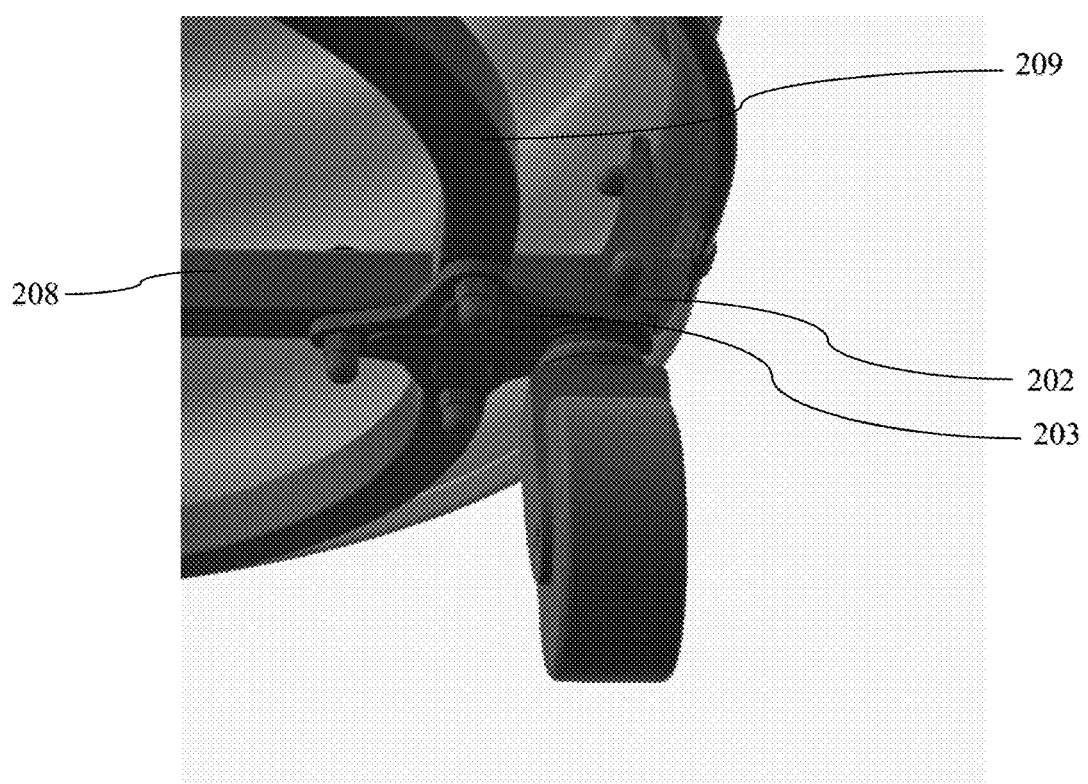
FIG. 14 depicts a perspective view of a connection between the raised garden bed module and the rolling bed module.
Figure 15:
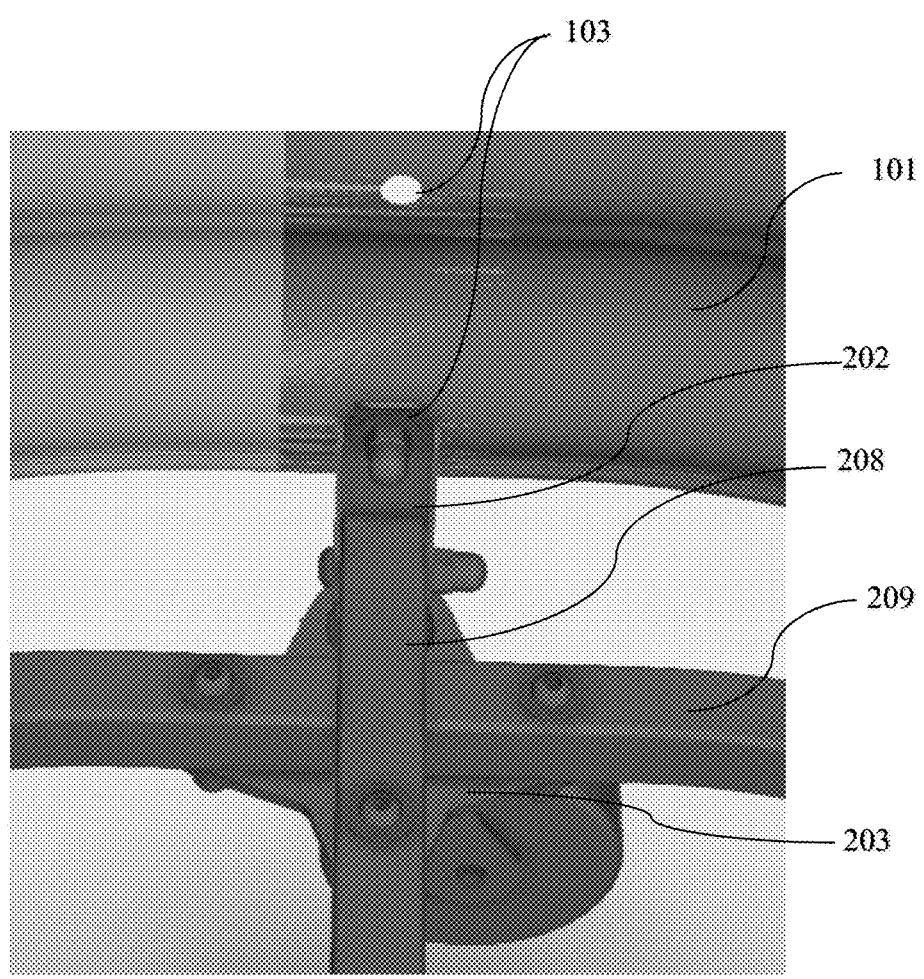
FIG. 15 depicts another perspective view of a connection between the raised garden bed module and the rolling bed module as shown in FIG. 14.

As further illustrated in FIGS. 14-15, in one embodiment, the supporting beams 208 are connected to the outer frame 209 via a brace 203. The brace 203 includes a plurality of receiving holes, which receive fasteners therethrough and attached to the supporting beams 208 and/or the outer frame 209 by the fasteners. In one embodiment, the brace 203 has a cross shape. In another embodiment, the brace has a circular, a triangle, or a rectangular shape.

As shown in FIG. 15, the raised garden bed 100 is attached to the rolling bed module 200 via the garden bed anchors 202. In one embodiment, a lower end of the garden bed anchors 202 is attached to the supporting beams 208 and/or the outer frame 209 by the fasteners, and the upper end of the garden bed anchors 202 has a fastening hole. In one embodiment, the raised garden bed 100 is attached to the rolling bed module 200 by a fastener simultaneously received by the hole 103 on the wall panel 101 and the fastening hole on the upper end of the garden bed anchors 202.

Figure 11:
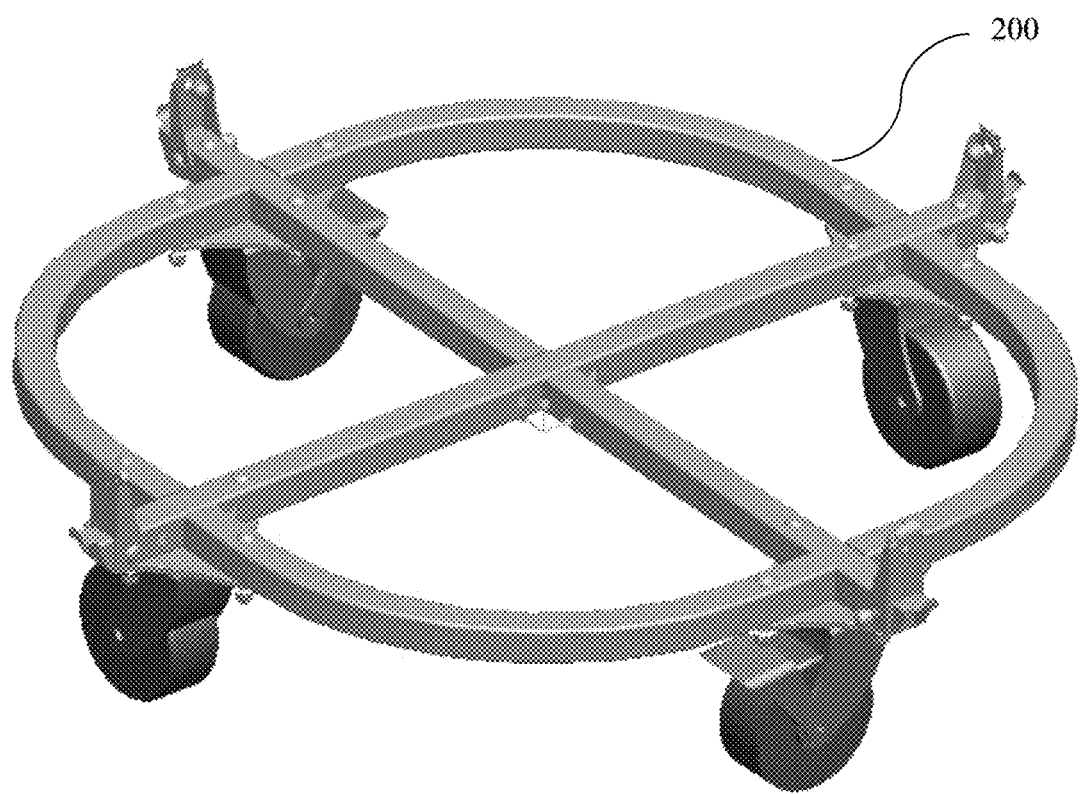
FIG. 11 depicts another perspective view of the rolling bed module as shown in FIG. 10.
Figure 12:
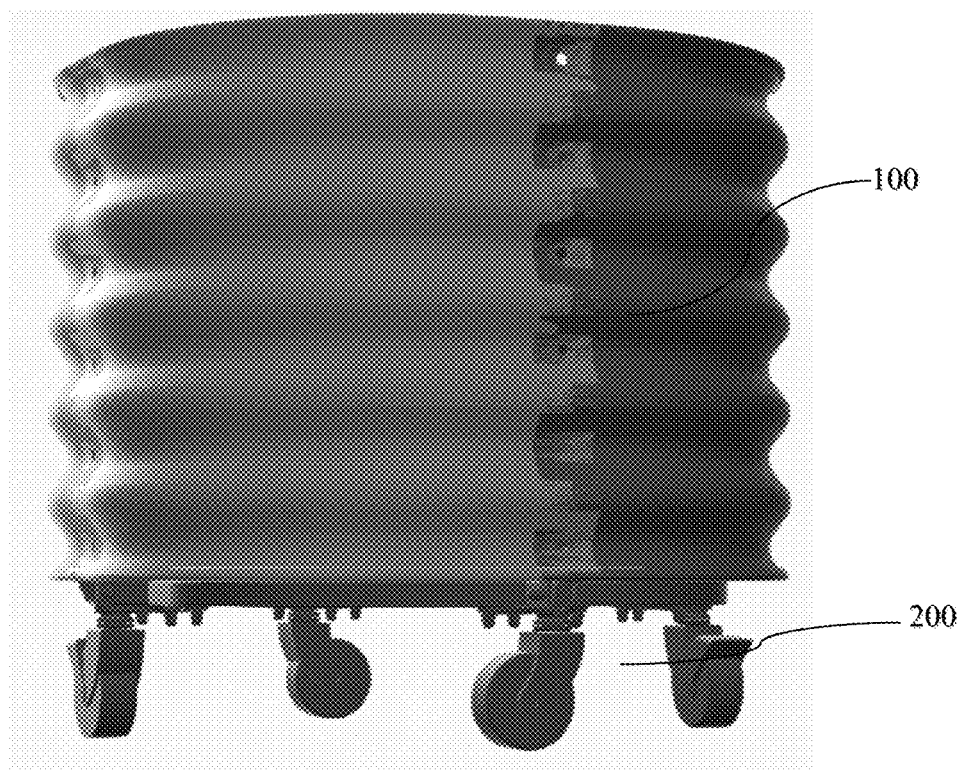
FIG. 12 depicts a perspective view of a raised garden bed module in association with the rolling bed module as shown in FIG. 11.
Figure 13:
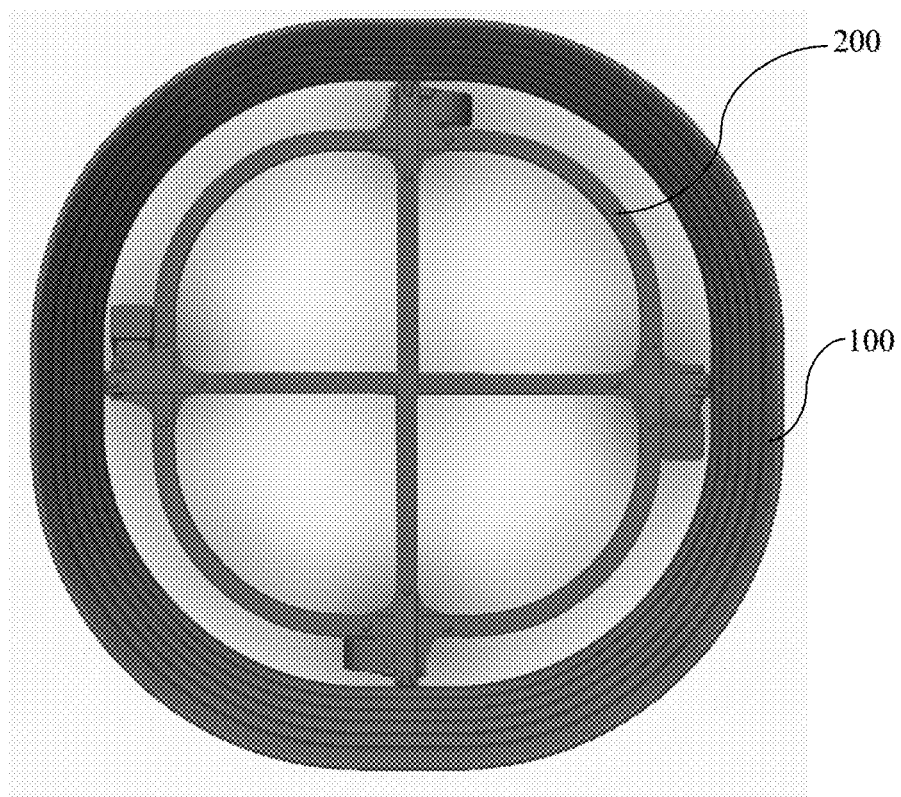
FIG. 13 depicts a top perspective view of a raised garden bed module in association with the rolling bed module as shown in FIG. 12.

FIG. 10 shows an embodiment of the rolling bed module 200. FIGS. 11-13 shows an embodiment the raised garden bed 100 is disposed on top of and attached to the rolling bed module 200. In this embodiment, the raised garden bed 100 has a dimension of 2 feet wide by 2 feet depth.

In one embodiment, as shown in FIG. 13, the outer frame 209 of the rolling bed module has a substantially similar shape as compared to the shape of the horizontal cross section of the raised garden bed 100. In another embodiment, the outer frame 209 of the rolling bed module has a shape different from the shape of the horizontal cross section of the raised garden bed 100.

In one embodiment, the outer frame 209 of the rolling bed module has a circular shape. In one embodiment, the outer frame 209 of the rolling bed module has an oval shape. In one embodiment, the outer frame 209 of the rolling bed module has a triangle shape. In one embodiment, the outer frame 209 of the rolling bed module has a triangle shape with one or more round corners. In one embodiment, the outer frame 209 of the rolling bed module has a rectangular shape. In one embodiment, the outer frame 209 of the rolling bed module has a rectangular shape with one or more round corners. In one embodiment, the outer frame 209 of the rolling bed module has a pentagon shape. In one embodiment, the outer frame 209 of the rolling bed module has a pentagon shape with one or more round corners. In one embodiment, the outer frame 209 of the rolling bed module has a hexagon shape. In one embodiment, the outer frame 209 of the rolling bed module has a hexagon shape with one or more round corners. In one embodiment, the outer frame 209 of the rolling bed module has an octagon shape. In one embodiment, the outer frame 209 of the rolling bed module has an octagon shape with one or more round corners. In one embodiment, the outer frame 209 of the rolling bed module has a star shape. In one embodiment, the outer frame 209 of the rolling bed module has a star shape with one or more round corners. In one embodiment, the outer frame 209 of the rolling bed module has a cross shape. In one embodiment, the outer frame 209 of the rolling bed module has a cross shape with one or more round corners. In one embodiment, the outer frame 209 of the rolling bed module has a heart shape.

In one embodiment, as shown in FIG. 13, the outer frame 209 of the rolling bed module has a dimension smaller than the dimension of the horizontal cross section of the raised garden bed 100. In another embodiment, the outer frame 209 of the rolling bed module has a dimension larger than the dimension of the horizontal cross section of the raised garden bed 100.

Figure 16:
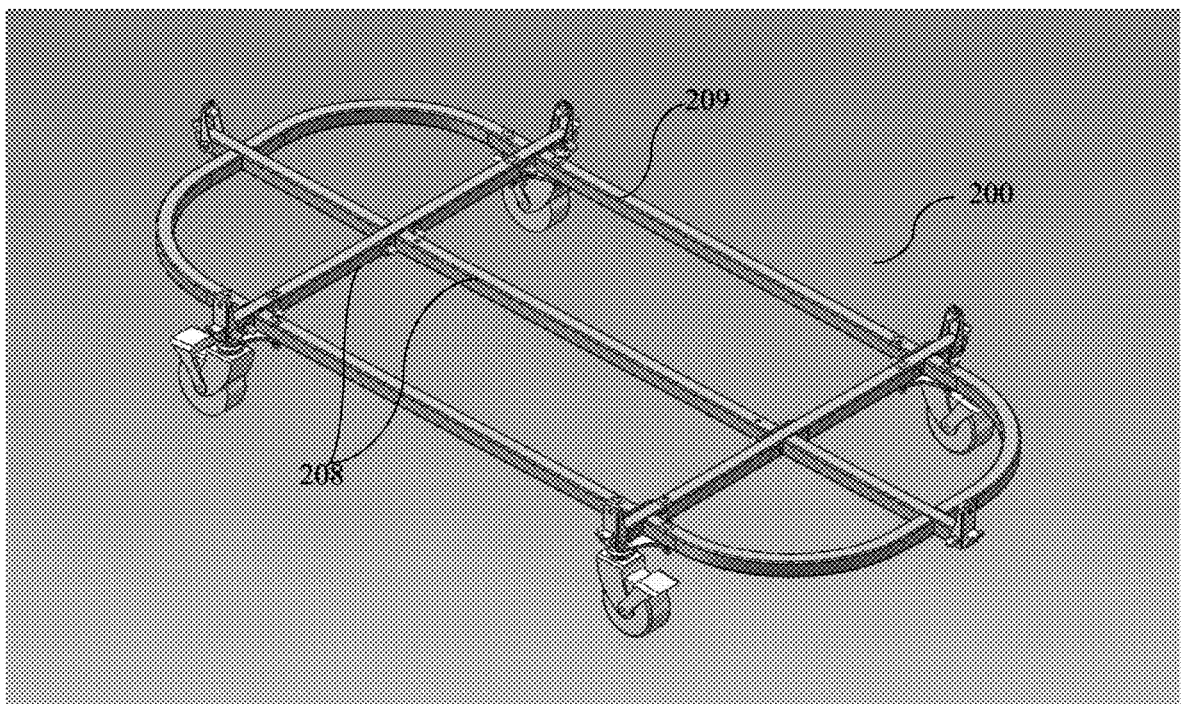
FIG. 16 depicts a perspective view of a rolling bed module.
Figure 17:
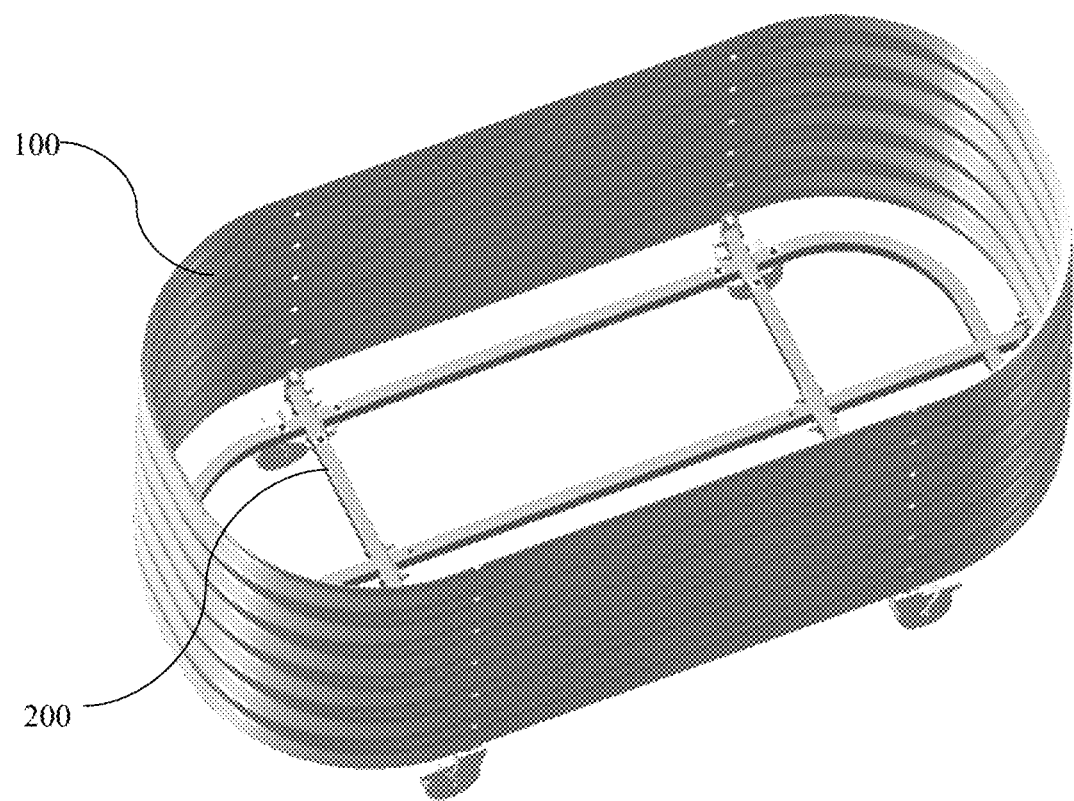
FIG. 17 depicts a perspective view of a raised garden bed module in association with the rolling bed module as shown in FIG. 16.
Figure 18:
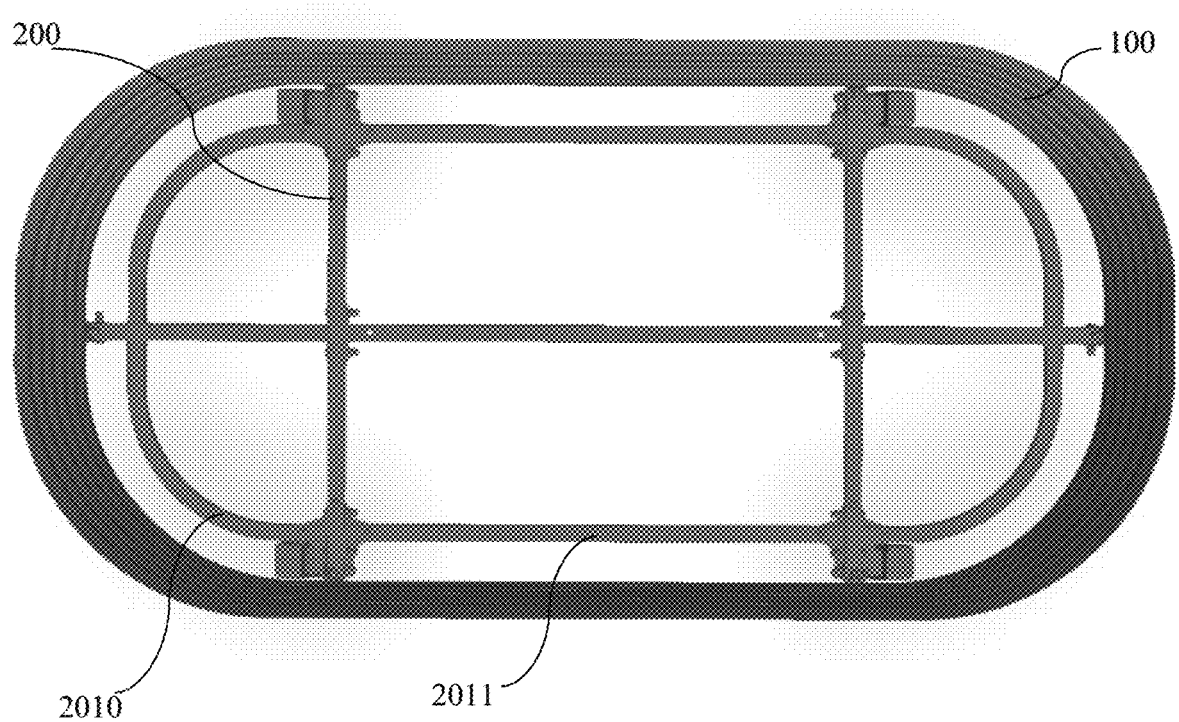
FIG. 18 depicts a top perspective view of a raised garden bed module in association with the rolling bed module as shown in FIG. 16.

FIG. 16-18 show a rolling bed module 200 in association with a raised garden bed 100 which has a dimension of 4 feet width and 2 feet depth. As shown in FIG. 16, in one embodiment, the rolling bed module 200 has three supporting beams 208 crossing each other.

Figure 19:
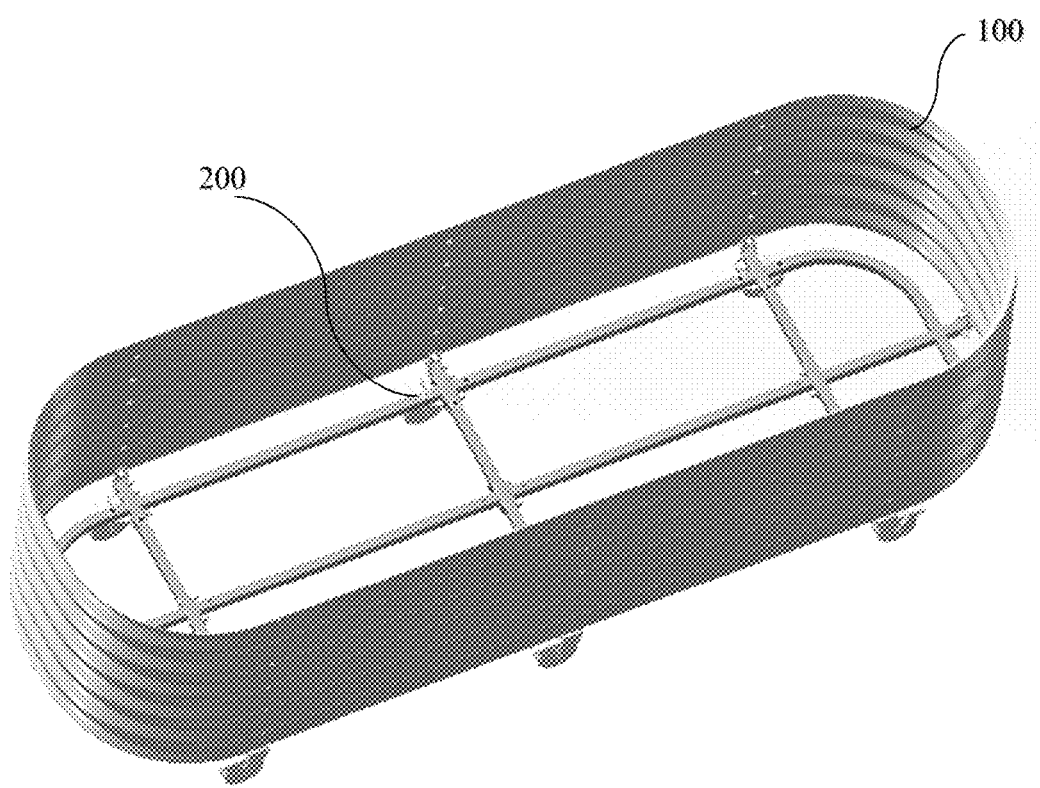
FIG. 19 depicts a perspective view of a raised garden bed module in association with a rolling bed module.

FIG. 19 shows a rolling bed module 200 in association with a raised garden bed 100 which has a dimension of 6 feet width and 2 feet depth. As shown in FIG. 19, in one embodiment, the rolling bed module 200 has four supporting beams 208 crossing each other.

In one embodiment, the shape and the dimension of the rolling bed module 200 can be customized according to the user's need, e.g. the shape and the size of the raised garden bed 100. In particular, the outer frame 209 of the rolling bed module 200 can be customized by assembling a plurality of curved beams 2010 and straight beams 2011, as shown in FIG. 18. The curved beams 2010 and the straight beams 2011 are connected using any method commonly known in the art, e.g. screw. A plurality of supporting beams 208 are interconnected to the curved beams 2010 and straight beams 2011 via the braces 203. In one embodiment, the supporting beams 208 has a extendable/telescoping structure such that its length can be adjusted so as to accommodate the size of the outer frame 209. The customizable outer frame 209 and the supporting beams 208 provide necessary strength to the rolling bed module, which permits the rolling bed module to support raised garden bed 100 whose dimension is larger than the existing garden bed available on the market, e.g., 8 feet width and 8 feet depth.

In one embodiment, the outer frame of the rolling bed module 200 has a dimension which is capable of receiving a raised bed garden 100 having a dimension of approximately 2 feet width and 2 feet depth. In one embodiment, the outer frame of the rolling bed module 200 has a dimension which is capable of receiving a raised bed garden 100 having a dimension of approximately 4 feet width and 2 feet depth. In one embodiment, the outer frame of the rolling bed module 200 has a dimension which is capable of receiving a raised bed garden 100 having a dimension of approximately 6 feet width and 2 feet depth. In one embodiment, the outer frame of the rolling bed module 200 has a dimension which is capable of receiving a raised bed garden 100 having a dimension of approximately 8 feet width and 2 feet depth. In one embodiment, the outer frame of the rolling bed module 200 has a dimension which is capable of receiving a raised bed garden 100 having a dimension of approximately 4 feet width and 4 feet depth. In one embodiment, the outer frame of the rolling bed module 200 has a dimension which is capable of receiving a raised bed garden 100 having a dimension of approximately 6 feet width and 4 feet depth. In one embodiment, the outer frame of the rolling bed module 200 has a dimension which is capable of receiving a raised bed garden 100 having a dimension of approximately 8 feet width and 4 feet depth. In one embodiment, the outer frame of the rolling bed module 200 has a dimension which is capable of receiving a raised bed garden 100 having a dimension of approximately 6 feet width and 6 feet depth. In one embodiment, the outer frame of the rolling bed module 200 has a dimension which is capable of receiving a raised bed garden 100 having a dimension of approximately 8 feet width and 6 feet depth. In one embodiment, the outer frame of the rolling bed module 200 has a dimension which is capable of receiving a raised bed garden 100 having a dimension of approximately 8 feet width and 8 feet depth.

Figure 3:
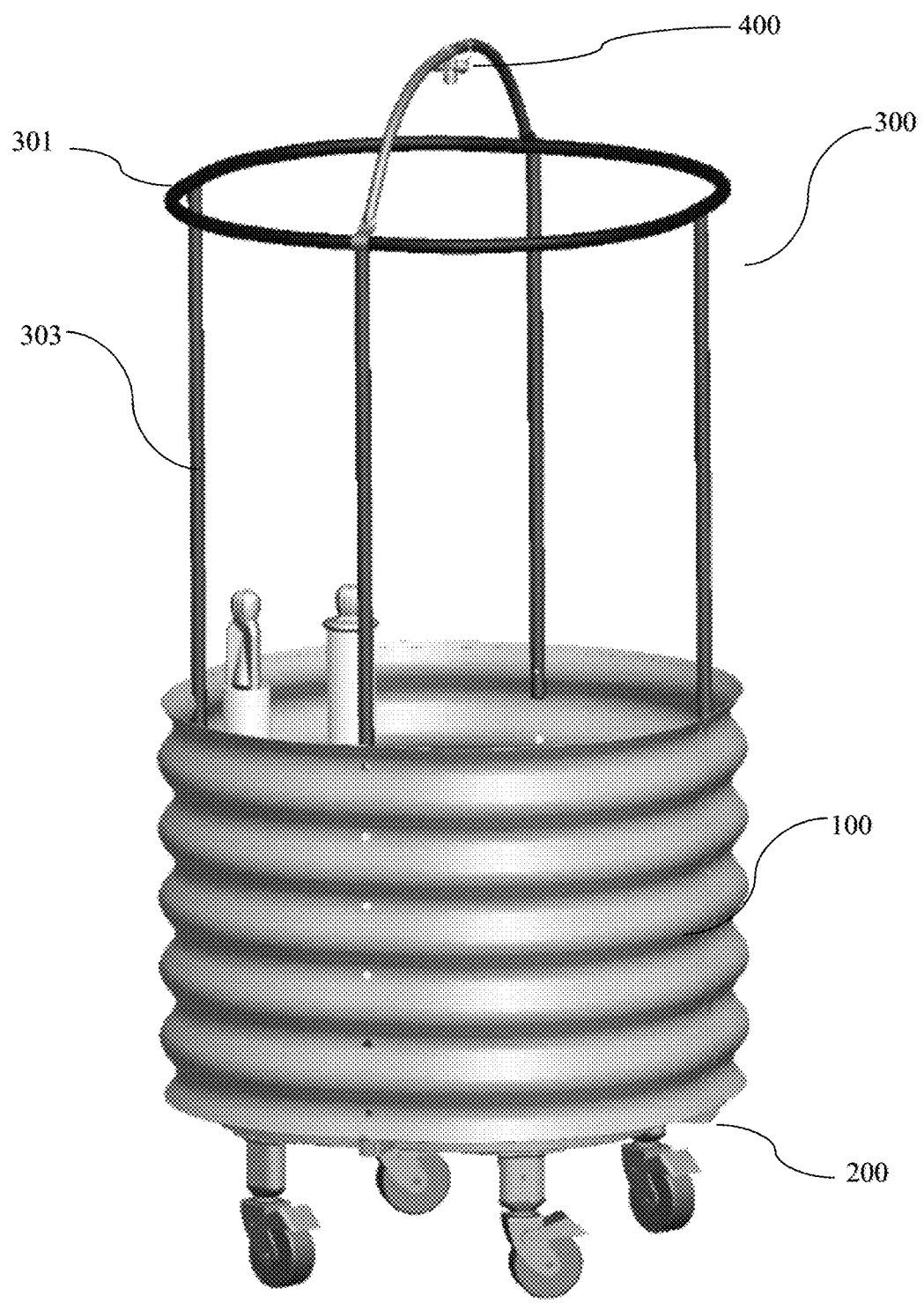
FIG. 3 depicts a perspective view of the expandable modular planting system (EMPS) shown in FIG. 1 with a mesh cover module and mister irrigation module.

As shown in FIG. 3, the rolling bed module 200 includes a plurality of supporting legs 203, mechanically supporting the elevated platform 201 from below. In one embodiment, there are 3, 4, 5, 6, 7, 8, or more supporting legs, depending on the shape of the elevated platform 201. In one embodiment, each of the supporting legs 203 is attached to the elevated platform 201 on its upper end, and attached to a rolling wheel 206 on its lower end, such that the rolling bed module 200 can be easily moved around, as preferred. In one embodiment, each of the supporting legs 203 has a telescope extending structure such that the length of each supporting leg 203 is adjustable. Therefore, the height of the rolling bed module 200 is adjustable and can be customized according to the user's need.

In one embodiment, the length of each supporting leg 203 is adjustable between 10 inches to 120 inches. In one embodiment, the height of the rolling bed module 200 is about 12 inches. In one embodiment, the height of the rolling bed module 200 is about 24 inches. In one embodiment, the height of the rolling bed module 200 is about 36 inches. In one embodiment, the height of the rolling bed module 200 is about 48 inches. In one embodiment, the height of the rolling bed module 200 is about 60 inches. In one embodiment, the height of the rolling bed module 200 is about 72 inches. In one embodiment, the height of the rolling bed module 200 is about 84 inches. In one embodiment, the height of the rolling bed module 200 is about 96 inches. In one embodiment, the height of the rolling bed module 200 is about 108 inches. In one embodiment, the height of the rolling bed module 200 is about 120 inches.

In one embodiment, the rolling bed module 200 can be customized and removable from the EPMS according the user's need.

As shown in FIG. 3, the mesh cover module 300 is disposed on top of and connected to the raised garden bed 100. The mesh cover module 300 prevents the critters and pests from accessing the raised garden bed 100. In addition, the mesh cover module 300 also balances humidity for the garden bed by maintaining the humidity inside the module. In one embodiment, the mesh cover module includes a bed cover frame connect to the wall panel(s) of the raised garden bed 100, and a cover mesh attached to or disposed over the bed cover frame.

The mister irrigation module 400 performs smart automatic and/or manual irrigation function. The mister irrigation module includes one or more misters, at least one sensors, and a control unit module for easier irrigation management. In one embodiment, the mister irrigation system module 400 is mechanically associated with or connected to the mesh cover module 300. In one embodiment, the mister irrigation module 400 includes temperature sensors, humidity sensors, pH sensors, sensors for nitrogen, phosphorus, potassium, and minerals for the soils in the garden bed, which provide timely monitoring of the garden bed soil conditions including pH value, nitrogen content, phosphorus content, potassium content, minerals content, and etc.

Figure 4:
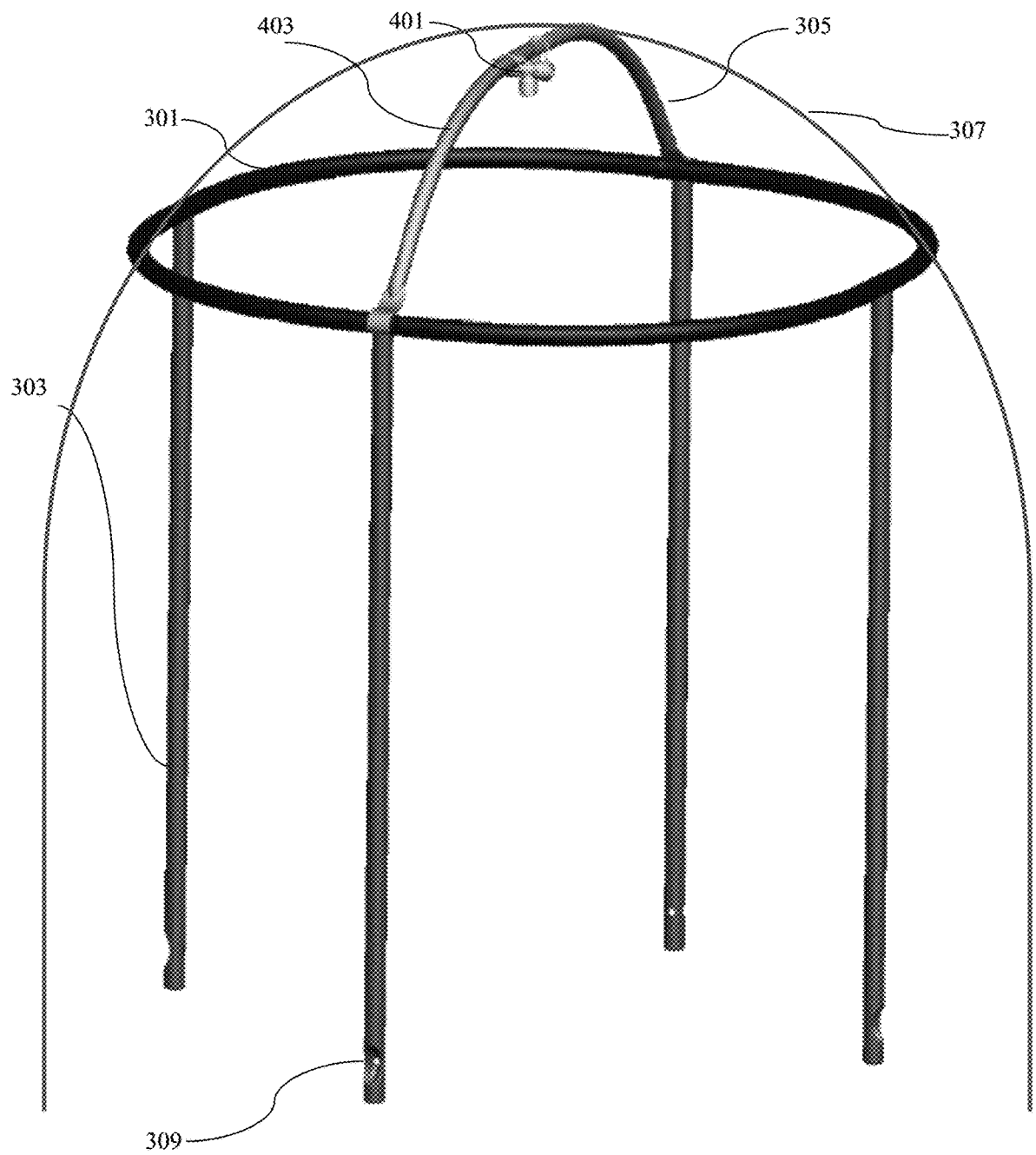
FIG. 4 depicts a perspective view of the bed cover module and mister irrigation module shown in FIG. 3.

FIGS. 3-4 depict the bed cover module 300 and the mister irrigation module 400. The bed cover module 300 includes a cover frame 301 and a plurality of frame legs 303 mechanically connect to the cover frame 301 on their upper ends. The plurality of frame legs 303 mechanically connect to the raised bed garden 100 on their lower ends.

In one embodiment, the lower end of the frame leg 303 may include a wall panel connecting niche 309. In one embodiment, the wall panel connecting niche 309 has a shape providing a seamless connection with the wall panel 101. For example, as shown in FIG. 4, when the wall panel 101 comprises a plurality of curved sections and thus has a sinusoidal configuration, the wall panel connecting niche 309 in contact with the wall panels also has a curved shape having substantially same amplitude and period such that the wall panel connecting niche 309 and the wall panel 101 seamlessly connect to each other. In one embodiment, the wall panel connecting niche 309 includes a hole for receiving a fastener, which attaches the mesh cover module 300 to the raised garden bed 100 via the fastening hole 103 on the wall panel 101.

In one embodiment, each of the frame legs 303 has a telescope extending structure such that the length of each frame leg 303 is adjustable. The adjustable frame legs 303 enable the height of the mesh cover module 300 to be customized according to the user's need.

In one embodiment, the length of each frame leg 303 is adjustable between 10 inches to 120 inches. In one embodiment, the height of the bed cover module 300 is about 12 inches. In one embodiment, the height of the bed cover module 300 is about 24 inches. In one embodiment, the height of the bed cover module 300 is about 36 inches. In one embodiment, the height of the bed cover module 300 is about 48 inches. In one embodiment, the height of the bed cover module 300 is about 60 inches. In one embodiment, the height of the bed cover module 300 is about 72 inches. In one embodiment, the height of the bed cover module 300 is about 84 inches. In one embodiment, the height of the bed cover module 300 is about 96 inches. In one embodiment, the height of the bed cover module 300 is about 108 inches. In one embodiment, the height of the bed cover module 300 is about 120 inches.

In one embodiment, the bed cover module 300 further includes one or more upper frames 305, on which a mesh 307 may be disposed, as shown in FIGS. 3-4. In one embodiment, the upper frames 305 have an arched shape.

The mesh 307 is disposed outside and surround the cover frame 301, the frame legs 303, and the upper frames 305, such that it forms an enclosed space above the raised garden bed 100, which prevents the pests, critters, and other insects from accessing to the plants in the raised garden bed 100. In one embodiment, the mesh 307 controls the humidity of the enclosed space above the raised garden bed by control the humidity in the air from leaving the enclosed space.

In one embodiment, the bed cover module 300 can be customized and removable from the EPMS according the user's need.

FIG. 4 also depicts the mister irrigation module 400. In particular, the mister irrigation module 400 includes one or more misters 401 which are fluidly connected to a water source/pump and provide water to the raised garden bed 100 via pipes 403. In one embodiment, the pipe 403 are attached to at least one of the cover frame 301, the frame legs 303, and the upper frames 305. In one embodiment, one or more of the cover frame 301, the frame legs 303, and the upper frames 305 have a tube structure that that at least a portion of the pipe 403 is enclosed in the tube structure of the cover frame 301, the frame legs 303, and/or the upper frames 305.

In one embodiment, the misters 401 water the garden bed by spraying the water to the raised garden bed 100. In one embodiment, the misters 401 are mechanically attached to the upper frame 305 of the mesh cover module 300. In another embodiment, the misters 401 are mechanically attached to the cover frame 301 and/or frame legs 303 of the mesh cover module 300.

In addition, FIGS. 1-2 also illustrate the wicking cell/self-watering module 500. The wicking cell/self-watering module 500 is disposed at the bottom of the raised bed garden 100, to collect excess water when the soil moisture level is high, and to feed the dry soil through wicking when the soil moisture level is low. In one embodiment, the wicking cell/self-watering module 500 is enclosed inside the raised bed garden and is supported by the rolling bed module 200. In another embodiment, the wicking cell/self-watering module 500 is disposed under the raised bed garden 100 and on top of the rolling bed module 200.

Figure 6:
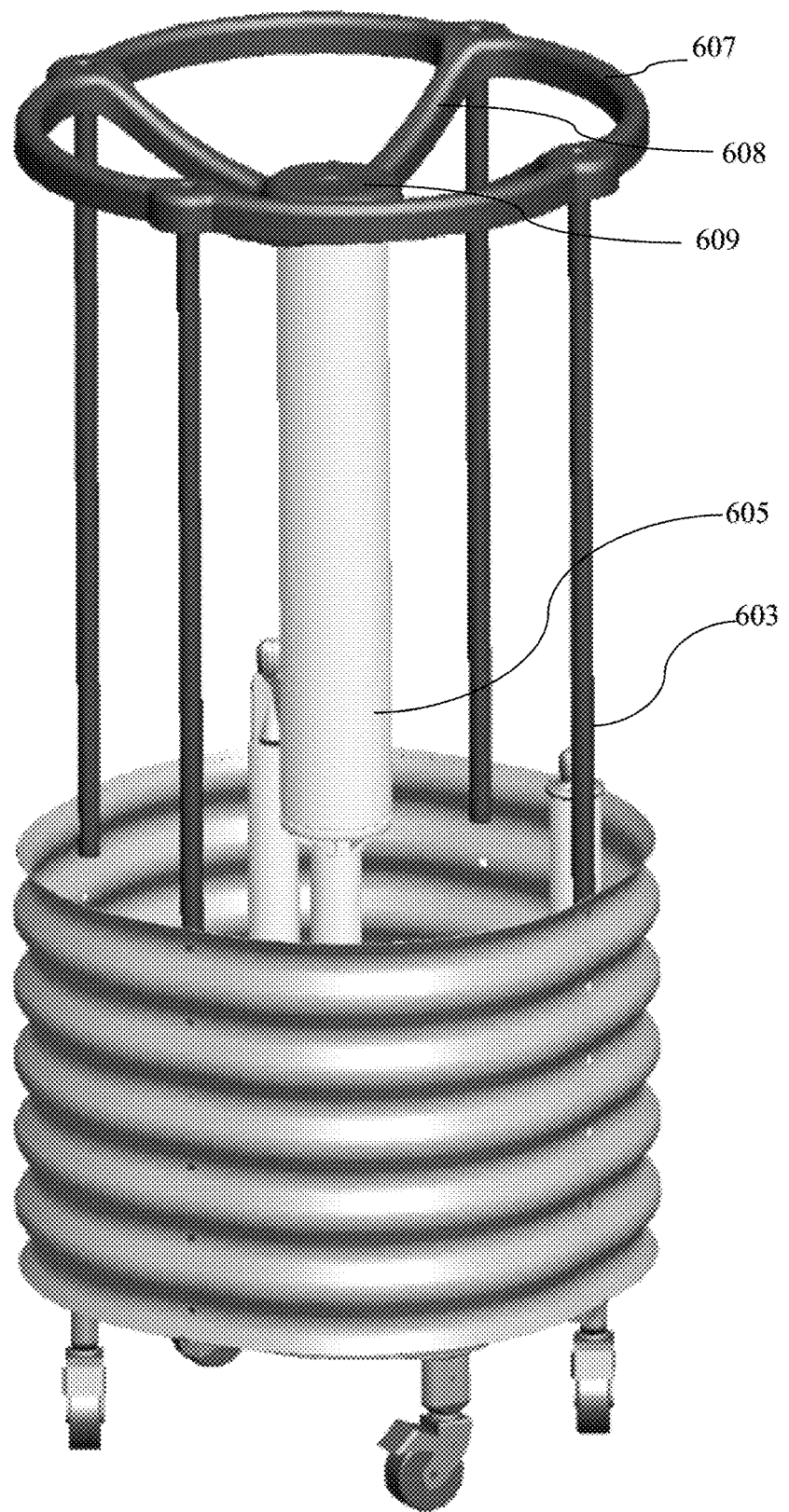
FIG. 6 depicts another perspective of the EMPS with the dragon fruit weight support trellis module as shown in FIG. 5.

FIG. 1 shows the wicking cell/self-watering module 500. The wicking cell/self-watering module 500 includes a wicking tray 501 having a plurality of recessed cells 502. In one embodiment, the wicking tray 501 is disposed at the bottom of the raised garden bed 100, and on top of the elevated platform 201, as shown in FIG. 6. The upper surface of the wicking tray 501 supports the content of the raised garden bed 100 including soil and plants, while the recessed cells 502 collect excess water when the soil moisture level is high. The collected water would feed the dry soil through wicking when the soil moisture level is low. In one embodiment, each of the recessed cells 502 has one or more openings on its bottom surface, through which the water may enter into a common water reservoir at the bottom of the wicking tray 501. In one embodiment, the wicking cell/self-watering module 500 has one or more pillars 503 in fluid communication with the reservoir of the wicking tray 501. Each of the pillars 503 is fluidly connected to the wicking tray 501 on its lower end, and connected to a cap structure 504 on its upper end. In one embodiment, water may be manually filled into or extracted from the reservoir of the wicking tray 501 via the pillar 503.

In one embodiment, the wicking cell/self-watering module 500 can be customized according the user's need and removable from the EPMS.

Figure 5:
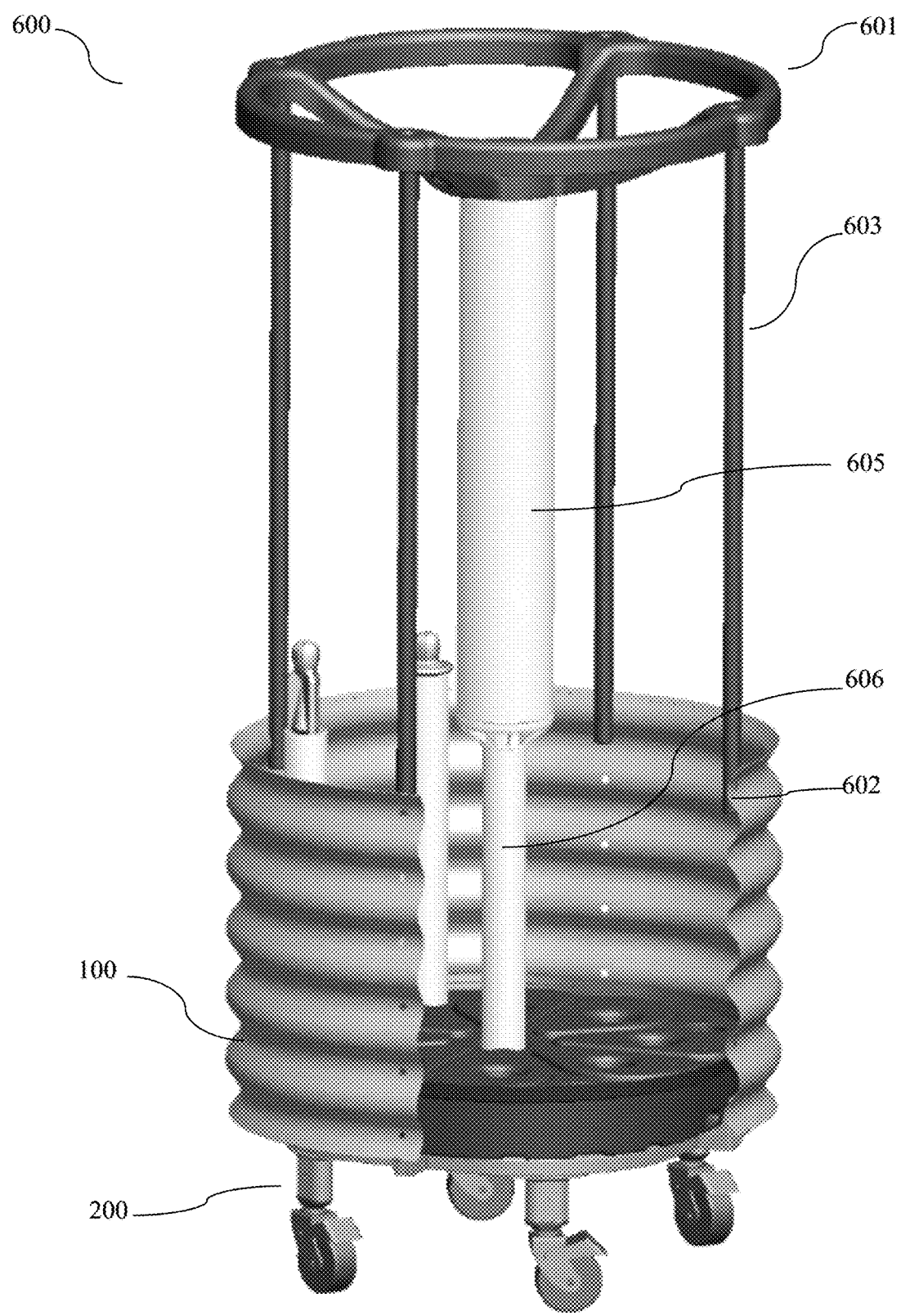
FIG. 5 depicts a perspective view of the EMPS shown in FIG. 1 with a dragon fruit weight support trellis module.
Figure 7:
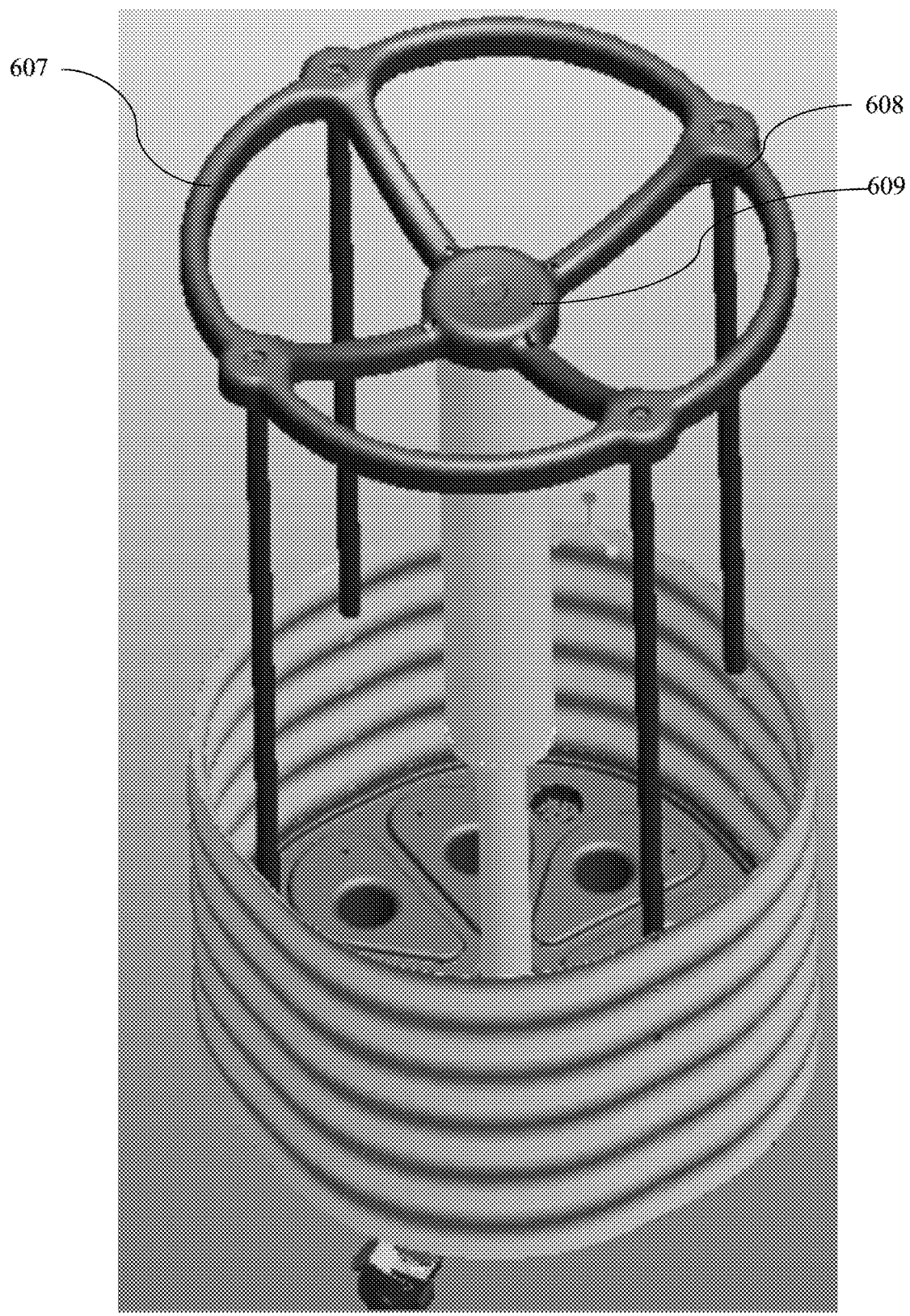
FIG. 7 depicts another perspective of the EMPS with the dragon fruit weight support trellis module as shown in FIG. 5.

FIGS. 5-7 shows a dragon fruit weight support trellis module 600 disposed in association with the EPMS. In one embodiment, the dragon fruit weight support trellis module 600 can be customized and removable from the EPMS according the user's need. For example, the EPMS can be used with the dragon fruit weight support trellis module 600 when dragon fruit plants are grown using the EPMS. However, when the EPMS is switched for growing another plant which requires better humidity control instead of weight support, the dragon fruit weight support trellis module 600 may be removed and mesh cover module 300 may be attached to the EPMS.

In one embodiment, the dragon fruit weight support trellis module 600 may be made of plastic, metal, wood, and other rigid materials. The dragon fruit weight support trellis module 600 provides support to plants which have a weight that may be heavy, for example, heavier than vines plants, such that a substantial portion of the plant's weight is supported by and distributed through the dragon fruit weight support trellis module 600.

In one embodiment, at least 20% of a plant's weight is supported by and distributed through the dragon fruit weight support trellis module 600. In one embodiment, at least 30% of a plant's weight is supported by and distributed through the dragon fruit weight support trellis module 600. In one embodiment, at least 40% of a plant's weight is supported by and distributed through the dragon fruit weight support trellis module 600. In one embodiment, at least 50% of a plant's weight is supported by and distributed through the dragon fruit weight support trellis module 600. In one embodiment, at least 60% of a plant's weight is supported by and distributed through the dragon fruit weight support trellis module 600. In one embodiment, at least 70% of a plant's weight is supported by and distributed through the dragon fruit weight support trellis module 600. In one embodiment, at least 80% of a plant's weight is supported by and distributed through the dragon fruit weight support trellis module 600. In one embodiment, at least 90% of a plant's weight is supported by and distributed through the dragon fruit weight support trellis module 600.

As shown in FIGS. 5-9, the dragon fruit weight support trellis module 600 includes a top wheel support 601 supported by a plurality of trellis legs 603 mechanically connect to the top wheel support 601 on their upper ends. The plurality of trellis legs 603 mechanically connect to the raised bed garden 100 on their lower ends.

In one embodiment, the lower end of each trellis leg 603 may include a wall panel connecting niche 602. In one embodiment, the wall panel connecting niche 602 has a shape providing a seamless connection with the wall panel 101. For example, as shown in FIG. 5, when the wall panel 101 comprises a plurality of curved sections and thus has a sinusoidal configuration, the wall panel connecting niche 602 in contact with the wall panels also has a curved shape having substantially same amplitude and period such that the wall panel connecting niche 602 and the wall panel 101 seamlessly connect to each other. In one embodiment, the wall panel connecting niche 602 includes a hole for receiving a fastener, which attaches the mesh cover module 300 to the raised garden bed 100 via the fastening hole 103 on the wall panel 101.

In one embodiment, each of the trellis leg 603 has a telescope extending structure such that the length of each trellis leg 603 is adjustable. The adjustable trellis leg 603 enable the height of the trellis module 600 to be customized according to the user's need.

In one embodiment, the length of each trellis leg 603 is adjustable between 10 inches to 120 inches. In one embodiment, the height of the dragon fruit weight support trellis module 600 is about 12 inches. In one embodiment, the height of the dragon fruit weight support trellis module 600 is about 24 inches. In one embodiment, the height of the dragon fruit weight support trellis module 600 is about 36 inches. In one embodiment, the height of the dragon fruit weight support trellis module 600 is about 48 inches. In one embodiment, the height of the dragon fruit weight support trellis module 600 is about 60 inches. In one embodiment, the height of the dragon fruit weight support trellis module 600 is about 72 inches. In one embodiment, the height of the dragon fruit weight support trellis module 600 is about 84 inches. In one embodiment, the height of the dragon fruit weight support trellis module 600 is about 96 inches. In one embodiment, the height of the dragon fruit weight support trellis module 600 is about 108 inches. In one embodiment, the height of the dragon fruit weight support trellis module 600 is about 120 inches.

Figure 8:
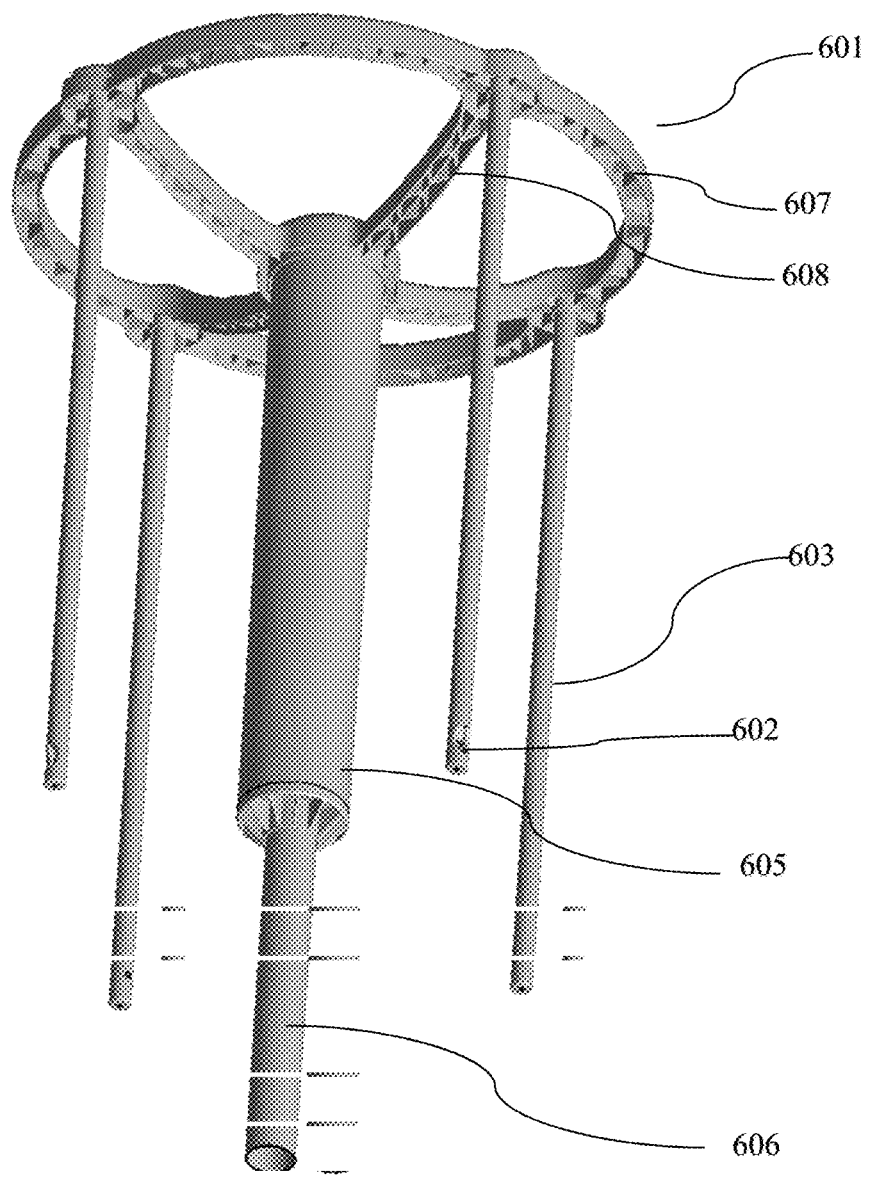
FIG. 8 depicts a perspective view of the dragon fruit weight support trellis module as shown in FIG. 5.
Figure 9:
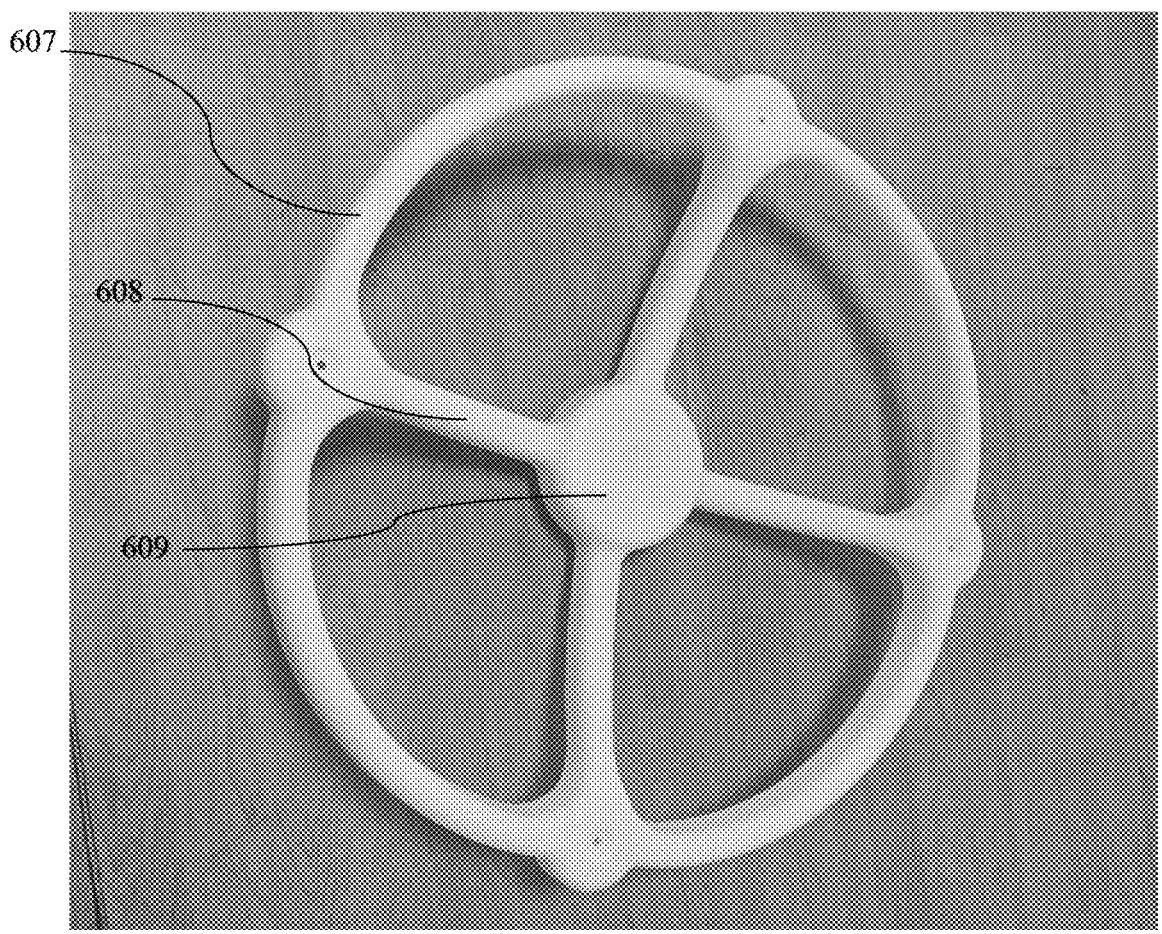
FIG. 9 depicts a perspective view of a top wheel support of the dragon fruit weight support trellis module as shown in FIG. 8.

As shown in FIGS. 7-9, the top wheel frame 601 of the dragon fruit weight support trellis module 600 further includes an outer wheel frame 607, and a wheel center piece 609, and a plurality of wheel supporting beams 608. In one embodiment, the outer wheel frame 607 has a circular shape. In one embodiment, the one end of the wheel supporting beam 608 is connected to the outer frame 607 and the other end of the wheel supporting beam 608 is connected to the wheel center piece 609. In one embodiment, the wheel center piece 609 locates in a position which is vertically lower than the outer wheel frame 607 such that the top wheel frame 601 forms a concave shape which enhances the weight supporting capability of the outer wheel frame, as compared to a flat shape.

In one embodiment, the spaces formed between the outer frame 607 and the wheel supporting beams 608 permit the parts of the plants, such as stems, branches, and fruits, to pass through. In one embodiment, the outer frame 607 holds the stems and/or branches of the plants together.

In one embodiment, the dragon fruit weight support trellis module 600 further comprises a center support tube 605 which is connected to the top wheel frame 601. In one embodiment, one end of the center support tube 605 is in mechanical and/or fluid connection with the wheel center piece 609 as shown in FIGS. 6-8. The other end of the center support tube 605 is in mechanical and/or fluid connection with a wicking tube 606.

In one embodiment, the wicking tube 606 is in mechanical and/or fluid connection with the reservoir of the wicking tray 501 of the wicking cell/self-watering module 500. In one embodiment, a user may add water to the reservoir of the wicking tray 501 through the wheel center piece 609 such that the water may flow through the center support tube 605 and wicking tube 606 before reaching the wicking tray 501. In one embodiment, the wheel center piece 609 is removable for the user to add water into the center support tube 605.

It should be noted that the dragon fruit weight support trellis module 600 is not limited to be used with the dragon fruit plant only. Any plant having a weight that requires extra support during its growth and fruiting process, the dragon fruit weight support trellis module 600 may be used for providing support to the plants.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. An expandable modular planting system (EMPS) for plant growing, the system comprising:
   a garden bed having at least one wall panel for containing soil that is configured to grow at least one plant therein; and
   a weight support trellis module connected to the garden bed, wherein the weight support trellis module supports at least 30% of the at least one plant, wherein the weight support trellis module comprises a top wheel support, and a plurality of trellis support legs, wherein the top wheel support comprises an outer frame, a center piece, and at least one beam connecting the outer frame and the center piece; and
   a wicking cell/self watering module, wherein the wicking cell/self watering module comprises a wicking tray having a water reservoir and at least one recessed cell in fluid communication with the water reservoir,
   wherein the weight support trellis module further comprises a wicking tube disposed between the center support tube and the wicking tray, wherein the wicking tube fluidly connects the center support tube and the wicking tray.

2. The EMPS for plant growth according to claim 1, wherein the weight support trellis module supports at least 50% weight of the at least one plant.

3. The EMPS for plant growth according to claim 1, wherein the weight support trellis module supports at least 70% weight of the at least one plant.

4. The EMPS for plant growth according to claim 1, wherein the weight support trellis module supports at least 90% weight of the at least one plant.

5. The EMPS for plant growth according to claim 1, wherein the at least one plant is a dragon fruit.

6. The EMPS for plant growth according to claim 1, being movable.

7. The EMPS for plant growth according to claim 1, wherein
   the EMPS further comprises a rolling bed module, wherein the rolling bed module comprises an outer frame and at least one supporting beam.

8. An expandable modular planting system (EMPS) for plant growing, the system comprising:

a garden bed having at least one wall panel for containing soil that is configured to grow at least one plant therein;

a weight support trellis module connected to the garden bed, wherein the weight support trellis module supports at least 30% of the at least one plant; and a rolling bed module, wherein the rolling bed module comprises an outer frame and at least one supporting beam, wherein the outer frame comprises a plurality of curved beams and straight beams, wherein the length of the curved beams and straight beams are adjustable.

9. The EMPS for plant growth according to claim 8, wherein the weight support trellis module comprises a top wheel support, and a plurality of trellis support legs.

10. The EMPS for plant growth according to claim 9, wherein an upper end of each trellis support leg is mechanically connected to the top wheel support, and a lower end of each trellis support leg is mechanically connected the wall panel of the garden bed.

11. The EMPS for plant growth according to claim 10, wherein the lower end of each trellis support leg comprises a niche which is in seamless contact with the wall panel of the garden bed.

12. The EMPS for plant growth according to claim 11, wherein the niche comprises a hole configured to receive a fastener attaching the trellis support leg to the wall panel of the garden bed.

13. The EMPS for plant growth according to claim 11, wherein the weight support trellis module is removable.

14. The EMPS for plant growth according to claim 9, wherein the top wheel support comprises an outer frame, a center piece, and at least one beam connecting the outer frame and the center piece.

15. The EMPS for plant growth according to claim 14, wherein the vertical position of the center piece is lower than the vertical position of the outer frame such that the top wheel support has a concave shape which is configured to enhance the weight supporting capability of the weight support trellis module.

16. The EMPS for plant growth according to claim 14, wherein the EMPS further comprises a wicking cell/self watering module, wherein the wicking cell/self watering module comprises a wicking tray having a water reservoir and at least one recessed cell in fluid communication with the water reservoir.

17. The EMPS for plant growth according to claim 16, wherein the water reservoir collects the excess water from the soil via the recessed cell when the humidity of the soil is high.

18. The EMPS for plant growth according to claim 16, wherein the wicking tray is disposed on the bottom of the garden bed.

19. The EMPS for plant growth according to claim 16, wherein the weight support trellis module further comprises a center support tube; wherein the center support tube is connected to the top wheel support on its upper end, and is in fluid communication with the wicking tray.

20. The EMPS for plant growth according to claim 19, wherein the weight support trellis module further comprises a wicking tube disposed between the center support tube and the wicking tray; wherein the wicking tube fluidly connects the center support tube and the wicking tray.

21. The EMPS for plant growth according to claim 19, wherein the center support tube is configured to receive water from an opening locating on the center piece of the top wheel support.

22. The EMPS for plant growth according to claim 8, wherein the length of the supporting beam is adjustable.

* * * * *